US011120134B2

(12) United States Patent
Lewis et al.

(10) Patent No.: US 11,120,134 B2
(45) Date of Patent: Sep. 14, 2021

(54) DETECTING UNWANTED COMPONENTS IN A COMPUTER SYSTEM BASED ON EMI FINGERPRINTS OBTAINED THROUGH AN INSERTABLE DEVICE (71) Applicant: Oracle International Corporation, Redwood Shores, CA (US)

(72) Inventors: Andrew J. Lewis, Litchfield, NH (US); Kenny C. Gross, Escondido, CA (US); Michael H. S. Dayringer, Union City, CA (US); Guang C. Wang, San Diego, CA (US)

(73) Assignee: Oracle International Corporation, Redwood City, CA (US)

( * ) Notice: Subject to any disclaimer, the term of this patent is extended or adjusted under 35 U.S.C. 154(b) by 189 days.

(21) Appl. No.: 16/384,722

(22) Filed: Apr. 15, 2019

(65) Prior Publication Data
US 2020/0201999 A1 Jun. 25, 2020

Related U.S. Application Data (60) Provisional application No. 62/782,188, filed on Dec. 19, 2018.

(51) Int. Cl.
G06F 21/00 (2013.01)
G06F 21/56 (2013.01)
(Continued)

(52) U.S. Cl.
CPC ....... *G06F 21/567* (2013.01); *G01R 31/2813* (2013.01); *G06F 17/142* (2013.01); *G06F 21/71* (2013.01)

(58) Field of Classification Search
CPC ...... G06F 21/567; G06F 17/142; G06F 21/71; G06F 21/566; G01R 31/2813
See application file for complete search history.

(56) References Cited

U.S. PATENT DOCUMENTS

| 8,138,916 B1* | 3/2012 | Gonzalez | ............... | G07D 11/30 |
|  |  |  |  | 340/540 |
| 2009/0099830 A1* | 4/2009 | Gross | ................. | G01R 31/2813 |
|  |  |  |  | 703/14 |

(Continued)

OTHER PUBLICATIONS

Song et al. "Counterfeit IC detection using light emission", 2014 International Test Conference, Date of Conference: Oct. 20-23 (Year: 2014).*

*Primary Examiner* — Morshed Mehedi
(74) *Attorney, Agent, or Firm* — Park, Vaughan, Fleming & Dowler LLP (57) ABSTRACT The disclosed embodiments provide a system that detects unwanted electronic components in a target computing system. During operation, the system obtains target electromagnetic interference (EMI) signals, which were gathered by monitoring EMI signals generated by the target computing system, using an insertable device, wherein when the insertable device is inserted into the target computing system, the insertable device gathers the target EMI signals from the target computing system. Next, the system generates a target EMI fingerprint from the target EMI signals. Finally, the system compares the target EMI fingerprint against a reference EMI fingerprint for the target computing system to determine whether the target computing system contains any unwanted electronic components.

17 Claims, 4 Drawing Sheets (51) Int. Cl.
*G06F 17/14* (2006.01)
*G01R 31/28* (2006.01)
*G06F 21/71* (2013.01)

(56) References Cited

U.S. PATENT DOCUMENTS

| | | | | |
|---|---|---|---|---|
| 2009/0150324 | A1* | 6/2009 | Dhanekula | G06N 5/04 |
| | | | | 706/52 |
| 2009/0302113 | A1* | 12/2009 | Li | G07F 9/026 |
| | | | | 235/454 |
| 2009/0306920 | A1* | 12/2009 | Zwinger | G01R 31/2884 |
| | | | | 702/77 |
| 2010/0230597 | A1* | 9/2010 | Kumhyr | G01J 5/04 |
| | | | | 250/340 |
| 2016/0259451 | A1* | 9/2016 | Bau | G06F 3/046 |
| 2017/0069176 | A1* | 3/2017 | Dietz | G07F 7/0873 |
| 2017/0160320 | A1* | 6/2017 | Aguayo Gonzalez | |
| | | | | G01R 31/31719 |

* cited by examiner

DETECTING UNWANTED COMPONENTS IN A COMPUTER SYSTEM BASED ON EMI FINGERPRINTS OBTAINED THROUGH AN INSERTABLE DEVICE

RELATED APPLICATION

This application claims priority under 35 U.S.C. § 119 to U.S. Provisional Application No. 62/782,188, entitled "Insertable-Device EMI-Fingerprint Characterization and Security Assurance Certification for Enterprise Servers and Storage Systems" by the same inventors as the instant application, filed on 19 Dec. 2018, the contents of which are incorporated by reference herein.

BACKGROUND

Field

The disclosed embodiments generally relate to techniques for detecting unwanted electronic components in an enterprise computing system. More specifically, the disclosed embodiments relate to a technique that detects unwanted electronic components, such as spy chips, mod chips or counterfeit electronic components, in an enterprise computing system based on EMI fingerprints gathered through an insertable device.

Related Art

Unwanted electronic components, such as spy chips, mod chips or counterfeit components, are beginning to cause problems in enterprise computer systems. For example, bad actors will sometimes piggyback a "spy chip" onto a regular chip, or wire a "mod chip" onto a motherboard of a computer system to facilitate eavesdropping on transactions in an enterprise computer system. Counterfeit components also create problems because they often perform poorly, or fail within a short period of time.

Techniques have been developed to detect such unwanted components in enterprise computing systems based on electro-magnetic interference (EMI) fingerprints, which are analyzed using prognostic-surveillance techniques. (For example, see U.S. Pat. No. 8,069,480, entitled "Detecting Counterfeit Electronic Components Using EMI Telemetric Fingerprints" by inventors Kenny C. Gross, et al., filed 16 Oct. 2007.)

These previous techniques for EMI-fingerprint detection make use of an antenna, which is integrated into a handheld wand. However, a major challenge involved in using such a handheld wand is to ensure that the position and orientation of the handheld wand with respect to the monitored system is similar to that used while monitoring a certified golden system, which contains no unwanted electronic components. Otherwise, variability in the position and orientation of the handheld wand will adversely affect the rate of false-positives and the rate of missed alarms. It is possible to solve this problem by integrating an EMI-detecting antenna into newly manufactured enterprise computing systems. However, this will not help to detect unwanted components in the large installed base of existing enterprise computer systems, which do not possess such integrated antennas.

Hence, what is needed is a technique for detecting unwanted electronic components in enterprise computing systems without the drawbacks of existing techniques that rely on handheld wands.

SUMMARY

The disclosed embodiments provide a system that detects unwanted electronic components in a target computing system. During operation, the system obtains target EMI signals, which were gathered by monitoring EMI signals generated by the target computing system, using an insertable device, wherein when the insertable device is inserted into the target computing system, the insertable device gathers the target EMI signals from the target computing system. Next, the system generates a target EMI fingerprint from the target EMI signals. Finally, the system compares the target EMI fingerprint against a reference EMI fingerprint for the target computing system to determine whether the target computing system contains any unwanted electronic components.

In some embodiments, prior to obtaining the target EMI signals, the system generates the reference EMI fingerprint. This involves first obtaining reference EMI signals, which are generated by a reference computing system of the same type as the target computing system, wherein the reference computing system is certified not to contain unwanted electronic components, and wherein the reference EMI signals are obtained from a ground plane of the reference computing system. Next, the system generates the reference EMI fingerprint from the reference EMI signals.

In some embodiments, while generating the reference EMI fingerprint from the reference EMI signals, the system performs a reference Fast Fourier Transform (FFT) operation on the reference EMI signals to transform the reference EMI signals from a time-domain representation to a frequency-domain representation. Next, the system partitions an output of the reference FFT operation into a set of frequency bins, and then constructs a reference amplitude time-series signal for each of the frequency bins in the set of frequency bins. Next, the system selects a subset of frequency bins that are associated with the highest average correlation coefficients. Finally, the system generates the reference EMI fingerprint by combining reference amplitude time-series signals for each of the selected subset of frequency bins.

In some embodiments, while selecting the subset of frequency bins that are associated with the highest average correlation coefficients, the system first computes cross-correlations between pairs of amplitude time-series signals associated with pairs of the set of frequency bins. Next, the system computes an average correlation coefficient for each of the frequency bins. Finally, the system selects a subset of frequency bins that are associated with the highest average correlation coefficients.

In some embodiments, while generating the target EMI fingerprint from the target EMI signals, the system combines target amplitude time-series signals for each of a set of preselected frequencies being monitored by the insertable device.

In some embodiments, prior to obtaining the target EMI signals, the system trains a multivariate state estimation technique (MSET) model using the reference amplitude time-series signals for the reference EMI fingerprint. Next, while comparing the target EMI fingerprint against the reference EMI fingerprint, the system uses the trained MSET model, which receives the target amplitude time-series signals as inputs, to produce estimated values for the target amplitude time-series signals. Next, the system performs pairwise differencing operations between actual values and the estimated values for the amplitude time-series signals to produce residuals. The system then performs a sequential probability ratio test (SPRT) on the residuals to produce SPRT alarms. Finally, the system determines from the SPRT alarms whether the target computing system contains any unwanted electronic components.

In some embodiments, the insertable device comprises one of the following: a universal serial bus (USB) dongle, which is insertable into a USB port in the target computing system; a peripheral component interconnect (PCI) card, which is insertable into a PCI slot in the target computing system; and a hard-disk drive (HDD) filler package, which is insertable into an HDD slot in the target computing system.

In some embodiments, the insertable device gathers the target EMI signals through ground lines or other signal lines in the target computing system, or a through fixed antenna structure in the insertable device, which is optimized for a specific frequency range.

In some embodiments, the insertable device includes a software-defined radio (SDR) for communicating the target EMI signals with a data-acquisition unit.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a new technique for detecting the presence of unwanted electronic components, such as spy chips, mod chips or counterfeit electronic components, in enterprise computing systems. This new technique uses prognostic-surveillance mechanisms to detect EMI fingerprints based on EMI signals collected through insertable devices, such as USB dongles, PCI cards, and HDD filler packages, to detect EMI fingerprints in EMI signals obtained from the backplanes of enterprise computer systems. These insertable devices make it easy to periodically check servers in the supply chain, at ports of entry, or during initial setup preparation and testing, which take place when servers are received at a datacenter. This ensures that no unwanted electronic components are installed in an enterprise computing system in a manufacturing plant, or in transit between the manufacturing plant and the customer datacenter. These insertable devices can monitor EMI signals from existing ground lines or other signals lines in the computer system (or through a fixed antenna structure in the insertable device, which optimized for a specific frequency range), to provide EMI-fingerprint-based security assurance for a wide range of enterprise computers, personal computers and storage systems.

The disclosed embodiments make use of a "pre-trained" MSET pattern-recognition model, which is trained on a "golden system" of the same type as the system under test. This golden system is certified to have no degraded components, mod chips, or counterfeit components. We have demonstrated that for a given model and configuration of computer system, if the computer system is either idle or executing a constant load, the EMI fingerprint is unique and reproducible for that computer system.

While training on the golden system, the EMI signals can be gathered using a relatively expensive monitoring device, which can simultaneously monitor a wide range of frequencies. We can then "bin" the frequencies in the EMI signals and select the top frequencies (e.g., 20 frequencies) in terms of dynamic information content and cross-correlations.

After training the MSET model on a "golden system," the MSET model is subsequently used in a surveillance mode to detect unwanted electronic devices in the same type of system. During this surveillance mode, an insertable device can be plugged into a system being tested. Note that this insertable device can be a relatively cheaper monitoring device, which is not able to simultaneously monitor a wide range of frequencies, but is instead tuned to cycle through the selected set of top frequencies described above.

Moreover, during this surveillance mode (and while training on the golden system), it is advantageous to run a dynamic load on the system under test so that the frequency signals exhibit even greater cross correlation, which better facilitates the detection of unwanted electronic components.

Before describing our new technique further, we first describe an exemplary unwanted-component detection system in which it operates.

Unwanted-Component Detection System

Figure 1:
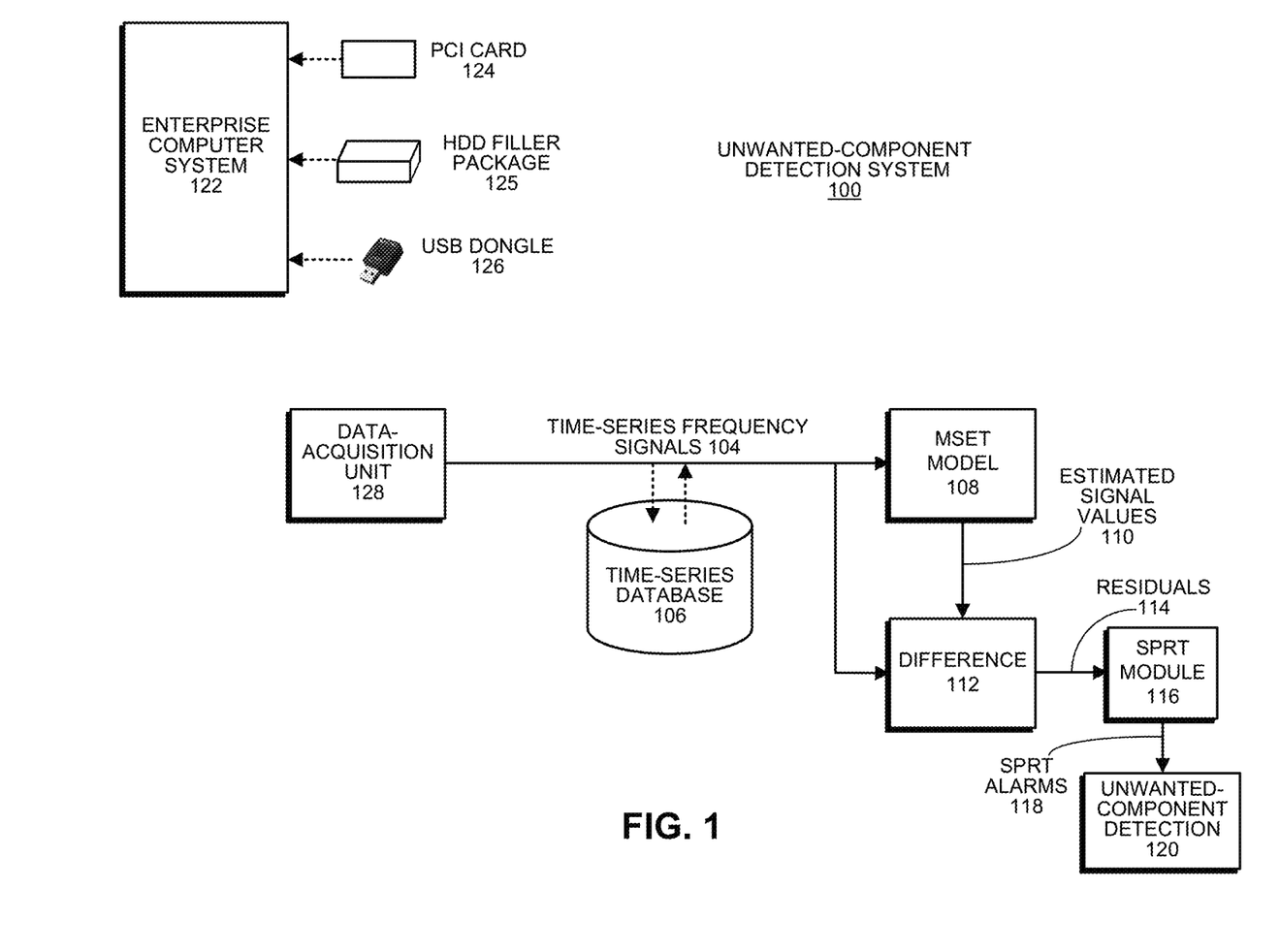
FIG. 1 illustrates an unwanted-component detection system in accordance with the disclosed embodiments.

FIG. 1 illustrates an exemplary unwanted-component detection system 100 in accordance with the disclosed embodiments. As illustrated in FIG. 1, unwanted-component detection system 100 gathers EMI signals using one of a number of possible insertable devices, such as: a PCI card 124, which is insertable into a PCI slot in the target computing system; an HDD filler package 125, which is insertable into an HDD slot in the target computing system; and a USB dongle 126, which is insertable into a USB port in the target computing system. Note that, when inserted, each of these insertable devices 124-126 is electrically coupled to a ground plane or other signals lines of enterprise computer system 122 (or includes a fixed antenna structure, which optimized for a specific frequency range) to gather EMI signals from the enterprise computing system. The gathered EMI signals are then communicated to a data-acquisition unit 128.

In some embodiments, the insertable device is implemented as a two-part device comprising a primary part and a secondary part, wherein there are at least two possible implementations for the primary part, and the secondary part is optional. The primary part can be implemented as either: (1) an antenna, or (2) a direct electrical connection to an existing line in the system, which we can observe as if it were an antenna. The optional secondary part can be some type of active module, which includes a radio-frequency (RF) receiver and an analog-to-digital converter (ADC), to perform functions, such as: frequency tuning, demodulation, mixing, sampling, conversion, and reporting. Note that this secondary part is optional in the insertable device because the same functions can alternatively be implemented outside of the server, which means the functions do not have to be implemented inside the insertable device.

During operation of unwanted-component detection system 100, time-series signals 104 can feed into a time-series database 106, which stores the time-series signals 104 for subsequent analysis. Next, time-series signals 104 either feed directly from data-acquisition unit 128 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series frequency signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and to generate SPRT alarms 118. (For a description of the SPRT model, please see Wald Abraham, June 1945, "Sequential Tests of Statistical Hypotheses." *Annals of Mathematical Statistics.* 16 (2): 117-186.)

SPRT alarms 118 then feed into an unwanted-component detection module 120, which detects the presence of unwanted components inside enterprise computer system 122 based on the tripping frequencies of SPRT alarms 118.

Process of Detecting Counterfeit Components

Figure 2:
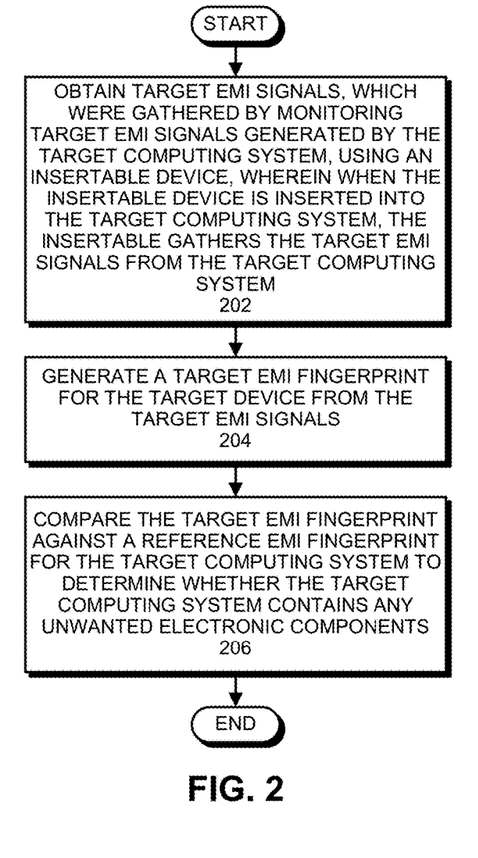
FIG. 2 presents a flow chart illustrating a process for detecting unwanted components in an enterprise computer system in accordance with the disclosed embodiments.

FIG. 2 presents a flow chart illustrating a process for detecting unwanted electronic components in a target computing system in accordance with the disclosed embodiments. First, the system obtains target EMI signals, which were gathered by monitoring EMI signals generated by the target computing system, using an insertable device, wherein when the insertable device is inserted into the target computing system, the insertable device gathers the target EMI signals from the target computing system (step 202). (During this monitoring process, the target computer system can be running a pre-specified dynamic workload to accentuate cross-correlations between components of the target EMI signals.) Next, the system generates a target EMI fingerprint from the target EMI signals (step 204). Finally, the system compares the target EMI fingerprint against a reference EMI fingerprint for the target computing system to determine whether the target computing system contains any unwanted electronic components (step 206).

Figure 3:
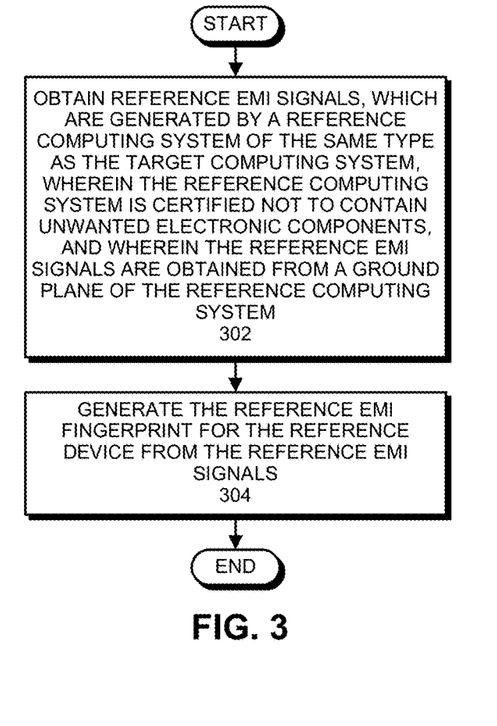
FIG. 3 presents a flow chart illustrating a process for generating a reference EMI fingerprint for the target device in accordance with the disclosed embodiments.

FIG. 3 presents a flow chart illustrating a process for generating a reference EMI fingerprint for the target device in accordance with the disclosed embodiments. Prior to obtaining the target EMI signals, the system obtains reference EMI signals, which are generated by a reference computing system of the same type as the target computing system, wherein the reference computing system is certified not to contain unwanted electronic components, and wherein the reference EMI signals are obtained from a ground plane of the reference computing system (step 302). Next, the system generates the reference EMI fingerprint from the reference EMI signals (step 304).

Figure 4:
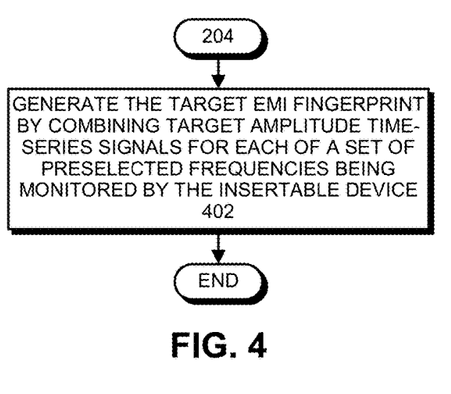
FIG. 4 presents a flow chart illustrating a process for generating a target EMI fingerprint from target EMI signals in accordance with the disclosed embodiments.

FIG. 4 presents a flow chart illustrating a process for generating a target EMI fingerprint from target EMI signals in accordance with the disclosed embodiments. (This flow chart illustrates in more detail the operations performed in step 204 of the flow chart in FIG. 2.) While generating the target EMI fingerprint from the target EMI signals, the system combines target amplitude time-series signals for each of a set of preselected frequencies being monitored by the insertable device (step 402).

Figure 5A:
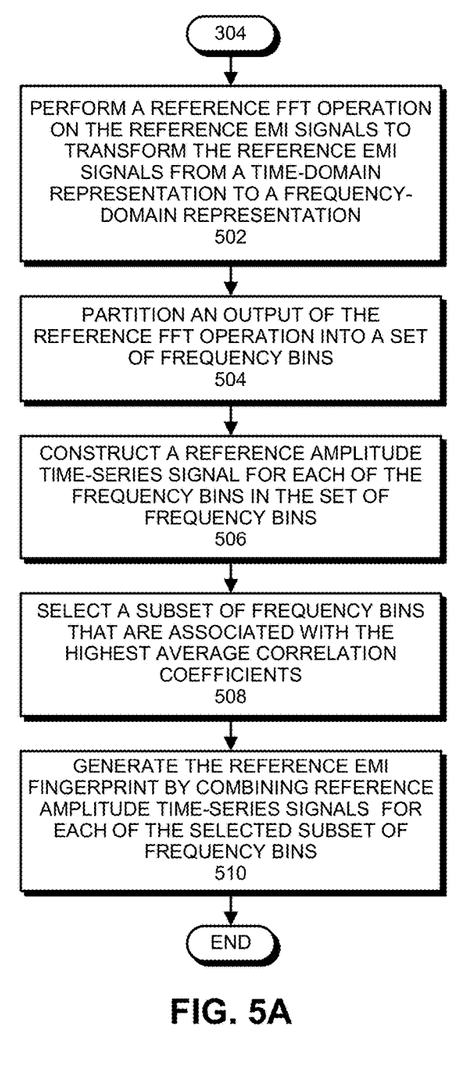
FIG. 5A presents a flow chart illustrating a process for generating a reference EMI fingerprint from reference EMI signals in accordance with the disclosed embodiments.

FIG. 5A presents a flow chart illustrating a process for generating a reference EMI fingerprint from reference EMI signals in accordance with the disclosed embodiments. (This flow chart illustrates in more detail the operations performed in step 304 of the flow chart in FIG. 3.) First, the system performs a reference FFT operation on the reference EMI signals to transform the reference EMI signals from a time-domain representation to a frequency-domain representation (step 502). Next, the system partitions an output of the reference FFT operation into a set of frequency bins (step 504). The system then constructs a reference amplitude time-series signal for each of the frequency bins in the set of frequency bins (step 506). Next, the system selects a subset of frequency bins that are associated with the highest average correlation coefficients (step 508). Finally, the system generates the reference EMI fingerprint by combining reference amplitude time-series signals for each of the selected subset of frequency bins (step 510).

Figure 5B:
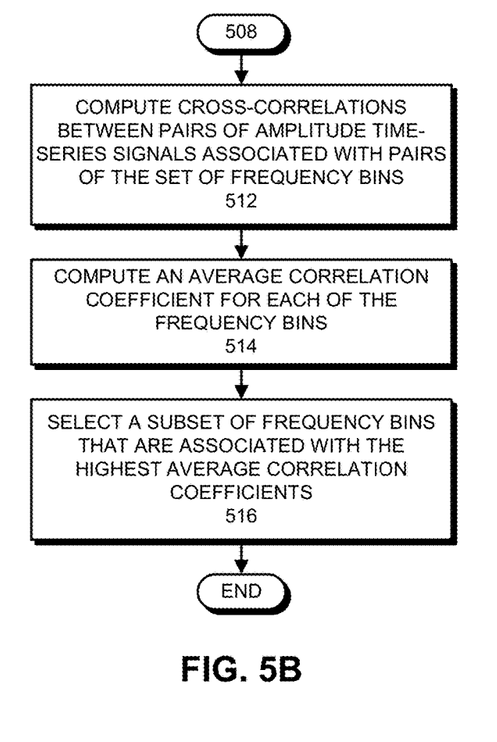
FIG. 5B presents a flow chart illustrating a process for selecting frequency bins with the highest correlation coefficients in accordance with the disclosed embodiments.

FIG. 5B presents a flow chart illustrating a process for selecting frequency bins with the highest correlation coefficients in accordance with the disclosed embodiments. (This flow chart illustrates in more detail the operations performed in step 508 of the flow chart in FIG. 5A.) The system first computes cross-correlations between pairs of amplitude time-series signals associated with pairs of the set of frequency bins (step 512). Next, the system computes an average correlation coefficient for each of the frequency bins (step 514). Finally, the system selects a subset of frequency bins that are associated with the highest average correlation coefficients (step 516).

Figure 6:
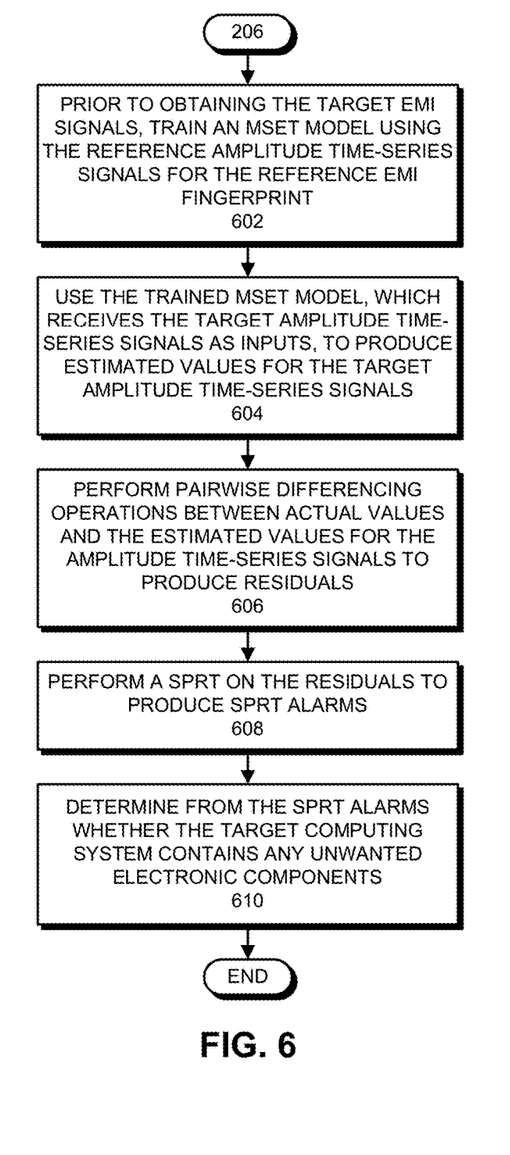
FIG. 6 presents a flow chart illustrating a process for comparing a target EMI fingerprint with a reference EMI fingerprint in accordance with the disclosed embodiments.

FIG. 6 presents a flow chart illustrating a process for comparing a target EMI fingerprint with a reference EMI fingerprint in accordance with the disclosed embodiments. (This flow chart illustrates in more detail the operations performed in step 206 of the flow chart in FIG. 2.) Prior to obtaining the target EMI signals, the system trains an MSET model using the reference amplitude time-series signals for the reference EMI fingerprint (step 602). Next, the system uses the trained MSET model, which receives the target amplitude time-series signals as inputs, to produce estimated values for the target amplitude time-series signals (step 604). The system then performs pairwise differencing operations between actual values and the estimated values for the amplitude time-series signals to produce residuals (step 606). Next, the system performs a sequential SPRT on the residuals to produce SPRT alarms (step 608). Finally, the system determines from the SPRT alarms whether the target computing system contains any unwanted electronic components (step 610).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting unwanted electronic components in a target computing machine, the method comprising:
    obtaining reference EMI signals generated by a reference computing machine of the same type as the target computing machine;
    generating a reference EMI fingerprint from the reference EMI signals by:
        performing a reference Fast Fourier Transform (FFT) operation on the reference EMI signals to transform the reference EMI signals from a time-domain representation to a frequency-domain representation;
        partitioning an output of the reference FFT operation into a set of frequency bins;
        constructing a reference amplitude time-series signal for each of the frequency bins in the set of frequency bins;
        selecting a subset of frequency bins that are associated with the highest average correlation coefficients; and
        generating the reference EMI fingerprint by combining reference amplitude time-series signals for each of the selected subset of frequency bins;
    obtaining target electromagnetic interference (EMI) signals, which were gathered by monitoring EMI signals generated by the target computing machine using an insertable device, wherein when the insertable device is inserted into the target computing machine, the insertable device gathers the target EMI signals from the target computing machine;
    generating a target EMI fingerprint from the target EMI signals; and
    comparing the target EMI fingerprint against the reference EMI fingerprint for the target computing machine to determine whether the target computing machine contains any unwanted electronic components.

2. The method of claim 1, wherein selecting the subset of frequency bins involves:
    computing cross-correlations between pairs of amplitude time-series signals associated with pairs of the set of frequency bins;
    computing an average correlation coefficient for each of the frequency bins; and
    selecting a subset of frequency bins that are associated with the highest average correlation coefficients.

3. The method of claim 2, wherein generating the target EMI fingerprint from the target EMI signals involves combining target amplitude time-series signals for each of a set of preselected frequencies being monitored by the insertable device.

4. The method of claim 3, wherein comparing the target EMI fingerprint against the reference EMI fingerprint involves:
    prior to obtaining the target EMI signals, training a multivariate state estimation technique (MSET) model using the reference amplitude time-series signals for the reference EMI fingerprint;
    using the trained MSET model, which receives the target amplitude time-series signals as inputs, to produce estimated values for the target amplitude time-series signals;
    performing pairwise differencing operations between actual values and the estimated values for the amplitude time-series signals to produce residuals;
    performing a sequential probability ratio test (SPRT) on the residuals to produce SPRT alarms; and
    determining from the SPRT alarms whether the target computing machine contains any unwanted electronic components.

5. The method of claim 1, wherein:
the insertable device comprises one of the following:
    a universal serial bus (USB) dongle, which is insertable into a USB port in the target computing machine,
    a peripheral component interconnect (PCI) card, which is insertable into a PCI slot in the target computing machine, and a hard-disk drive (HDD) filler package, which is insertable into an HDD slot in the target computing machine; and the insertable device gathers the target EMI signals through ground lines or other signal lines in the target computing machine, or through a fixed antenna structure in the insertable device, which is optimized for a specific frequency range.

6. The method of claim 1, wherein the insertable device includes a software-defined radio (SDR) for communicating the target EMI signals with a data-acquisition unit.

7. A non-transitory, computer-readable storage medium storing instructions that when executed by a computer cause the computer to perform a method for detecting unwanted electronic components in a target computing machine, the method comprising:

obtaining reference EMI signals generated by a reference computing machine of the same type as the target computing machine;

generating a reference EMI fingerprint from the reference EMI signals by:

performing a reference Fast Fourier Transform (FFT) operation on the reference EMI signals to transform the reference EMI signals from a time-domain representation to a frequency-domain representation;

partitioning an output of the reference FFT operation into a set of frequency bins;

constructing a reference amplitude time-series signal for each of the frequency bins in the set of frequency bins;

selecting a subset of frequency bins that are associated with the highest average correlation coefficients; and generating the reference EMI fingerprint by combining reference amplitude time-series signals for each of the selected subset of frequency bins;

obtaining target EMI signals, which were gathered by monitoring EMI signals generated by the target computing machine using an insertable device, wherein when the insertable device is inserted into the target computing machine, the insertable device gathers the target EMI signals from the target computing machine;

generating a target EMI fingerprint from the target EMI signals; and comparing the target EMI fingerprint against the reference EMI fingerprint for the target computing machine to determine whether the target computing machine contains any unwanted electronic components.

8. The non-transitory, computer-readable storage medium of claim 7, wherein generating the target EMI fingerprint from the target EMI signals involves combining target amplitude time-series signals for each of a set of preselected frequencies being monitored by the insertable device.

9. The non-transitory, computer-readable storage medium of claim 8, wherein comparing the target EMI fingerprint against the reference EMI fingerprint involves:

prior to obtaining the target EMI signals, training an MSET model using the reference amplitude time-series signals for the reference EMI fingerprint;

using the trained MSET model, which receives the target amplitude time-series signals as inputs, to produce estimated values for the target amplitude time-series signals;

performing pairwise differencing operations between actual values and the estimated values for the amplitude time-series signals to produce residuals;

performing a SPRT on the residuals to produce SPRT alarms; and determining from the SPRT alarms whether the target computing machine contains any unwanted electronic components.

10. The non-transitory, computer-readable storage medium of claim 7, wherein:

the insertable device comprises one of the following:

a USB dongle, which is insertable into a USB port in the target computing machine, a PCI card, which is insertable into a PCI slot in the target computing machine, and an HDD filler package, which is insertable into an HDD slot in the target computing machine; and the insertable device gathers the target EMI signals through ground lines or other signal lines in the target computing machine, or through a fixed antenna structure in the insertable device, which is optimized for a specific frequency range.

11. The non-transitory, computer-readable storage medium of claim 7, wherein the insertable device includes a software-defined radio (SDR) for communicating the target EMI signals with a data-acquisition unit.

12. A system that detects unwanted electronic components in a target computing machine, comprising:

at least one processor and at least one associated memory; and a detection mechanism that executes on the at least one processor, wherein the detection mechanism:

obtains reference EMI signals generated by a reference computing machine of the same type as the target computing machine;

generates a reference EMI fingerprint from the reference EMI signals by:

performing a reference Fast Fourier Transform (FFT) operation on the reference EMI signals to transform the reference EMI signals from a time-domain representation to a frequency-domain representation;

partitioning an output of the reference FFT operation into a set of frequency bins;

constructing a reference amplitude time-series signal for each of the frequency bins in the set of frequency bins;

selecting a subset of frequency bins that are associated with the highest average correlation coefficients; and generating the reference EMI fingerprint by combining reference amplitude time-series signals for each of the selected subset of frequency bins;

obtains target EMI signals, which were gathered by monitoring EMI signals generated by the target computing machine using an insertable device, wherein when the insertable device is inserted into the target computing machine, the insertable device gathers the target EMI signals from target computing machine;

generates a target EMI fingerprint from the target EMI signals; and compares the target EMI fingerprint against the reference EMI fingerprint for the target computing machine to determine whether the target computing machine contains any unwanted electronic components.

13. The system of claim 12, wherein while generating the target EMI fingerprint from the target EMI signals, the detection mechanism combines target amplitude time-series signals for each of a set of preselected frequencies being monitored by the insertable device.

14. The system of claim 13, wherein while comparing the target EMI fingerprint against the reference EMI fingerprint, the detection mechanism:

- trains an MSET model using the reference amplitude time-series signals for the reference EMI fingerprint prior to obtaining the target EMI signals;
- uses the trained MSET model, which receives the target amplitude time-series signals as inputs, to produce estimated values for the target amplitude time-series signals;
- performs pairwise differencing operations between actual values and the estimated values for the amplitude time-series signals to produce residuals;
- performs a SPRT on the residuals to produce SPRT alarms; and
- determines from the SPRT alarms whether the target computing machine contains any unwanted electronic components.

15. The system of claim 12, wherein selecting the subset of frequency bins involves:

- computing cross-correlations between pairs of amplitude time-series signals associated with pairs of the set of frequency bins;
- computing an average correlation coefficient for each of the frequency bins; and
- selecting a subset of frequency bins that are associated with the highest average correlation coefficients.

16. The system of claim 12, wherein:

the insertable device comprises one of the following:
- a universal serial bus (USB) dongle, which is insertable into a USB port in the target computing machine,
- a peripheral component interconnect (PCI) card, which is insertable into a PCI slot in the target computing machine, and
- a hard-disk drive (HDD) filler package, which is insertable into an HDD slot in the target computing machine; and the insertable device gathers the target EMI signals through ground lines or other signal lines in the target computing machine, or through a fixed antenna structure in the insertable device, which is optimized for a specific frequency range.

17. The system of claim 12, wherein the insertable device includes a software-defined radio (SDR) for communicating the target EMI signals with a data-acquisition unit.

* * * * *

UNITED STATES PATENT AND TRADEMARK OFFICE
CERTIFICATE OF CORRECTION

PATENT NO. : 11,120,134 B2
APPLICATION NO. : 16/384722
DATED : September 14, 2021
INVENTOR(S) : Lewis et al.

Page 1 of 1

It is certified that error appears in the above-identified patent and that said Letters Patent is hereby corrected as shown below:

In the Specification

In Column 6, Line 9, after "Wald" insert -- , --.

Signed and Sealed this
Eighth Day of February, 2022

Drew Hirshfeld
*Performing the Functions and Duties of the
Under Secretary of Commerce for Intellectual Property and
Director of the United States Patent and Trademark Office*